United States Patent
Le Clerc

(10) Patent No.: US 6,404,461 B1
(45) Date of Patent: Jun. 11, 2002

(54) METHOD FOR DETECTING STATIC AREAS IN A SEQUENCE OF VIDEO PICTURES

(75) Inventor: François Le Clerc, Rennes (FR)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/266,430

(22) Filed: Mar. 11, 1999

(30) Foreign Application Priority Data

Apr. 14, 1998 (EP) .............................................. 98400918

(51) Int. Cl.$^7$ ................................................. H04N 5/14
(52) U.S. Cl. ....................................... 348/700; 382/236
(58) Field of Search ......................... 348/402.1, 407.1, 348/438.1, 416.1, 699, 700, 441, 451, 446, 448, 443, 445; 382/236, 239, 282, 251, 211, 268, 429.1; 375/240.16, 240.19, 240.21, 240.13; H04N 5/14; H04B 1/66

(56) References Cited

U.S. PATENT DOCUMENTS

| 4,951,138 A | | 8/1990 | Henot .......................... 358/133 |
| 5,081,532 A | * | 1/1992 | Rabii .......................... 348/700 |
| 5,818,535 A | * | 10/1998 | Asnis et al. ............. 348/416.1 |
| 6,222,589 B1 | * | 4/2001 | Faroudja et al. ............ 348/448 |
| 6,259,823 B1 | * | 7/2001 | Lee et al. .................... 382/268 |

FOREIGN PATENT DOCUMENTS

EP 690 617 A2 1/1996 ............ H04N/5/44

* cited by examiner

*Primary Examiner*—Chris Kelley
*Assistant Examiner*—Gims Philippe
(74) *Attorney, Agent, or Firm*—Joseph S. Tripoli; Ronald H. Kurdyla; Guy H. Eriksen

(57) ABSTRACT

The present invention is a method for detecting static areas in a sequence of digital video pictures. The method includes computing pixel differences between corresponding pixels of consecutive frames or consecutive fields with identical parities and accumulating the magnitudes of the pixel differences over blocks of pixels of the video frames. Next, thresholds $T(i,j)$ for pixel blocks are computed. The threshold for each block is adapted to an estimated noise level $\sigma$ for the current field or frame and the amount of a block gradient $g(i,j)$, and the threshold levels $T(i,j)$ are calculated according to a disclosed formula. Then, the thresholds $T(i,j)$ are applied to the accumulated pixel differences of the corresponding blocks thus providing a preliminary map of static areas and the preliminary map of static areas are modified by eliminating isolated static blocks or small groups of adjacent static blocks.

9 Claims, 4 Drawing Sheets

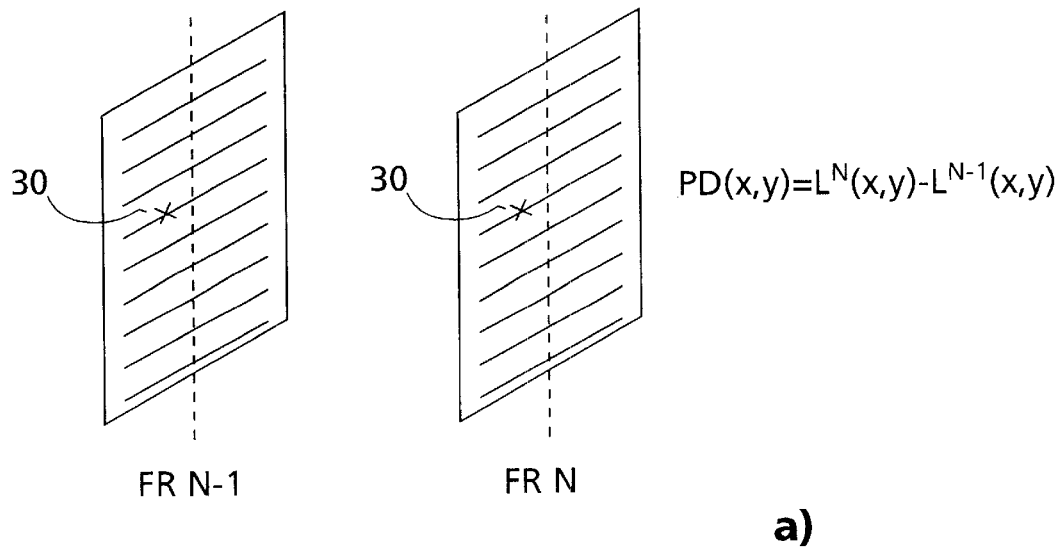
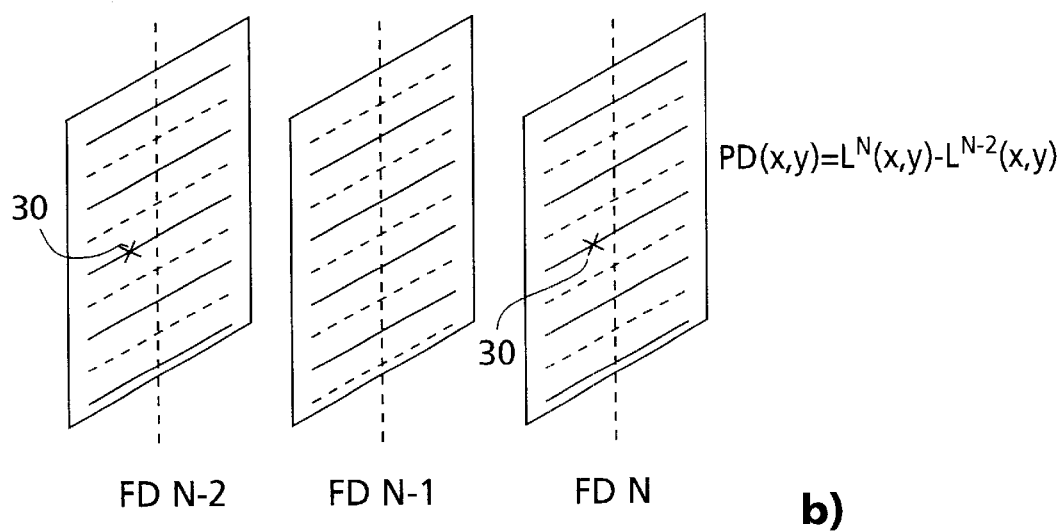
Fig.2

| B(1,1) | B(2,1) | B(3,1) | | | | |
|--------|--------|--------|--------|--------|--------|--------|
| B(1,2) | B(2,2) | | | | | |
| B(1,3) | | | | | | |
| | | | | | | |
| | | | B(i,j) | | | |
| | | | | | | |
| | | | | | | |
| | | | | | | |
| | | | | | | |

METHOD FOR DETECTING STATIC AREAS IN A SEQUENCE OF VIDEO PICTURES

BACKGROUND OF THE INVENTION

The invention relates to a method for detecting static areas in a sequence of digital video pictures. Such a method can be used generally in video signal processing devices for detecting motion in a sequence of video pictures. More specifically one application of the invention is the field of temporal video format conversion, which may or may not be motion-compensated. This includes algorithms for video upconversion such as in TV receivers equipped with 50 Hz to 100 Hz upconversion means. This field of application includes low-end upconversion algorithms where simple field/frame repetitions are used to generate intermediate fields/frames and high-end upconversion algorithms where intermediate fields/frames are calculated using motion estimation/compensation techniques. Another field of application is video standard conversion, typically 50 Hz to 60 Hz or 60 Hz to 50 Hz. Other important applications are the fields of MPEG video encoding and interlace to progressive scan conversion (deinterlacing).

The availability of a map of the static areas in a sequence of video pictures allows the implementation of specific processing for the pixels of non-moving areas. This allows e.g. for maintaining full resolution in static areas of a picture when using motion compensation techniques either for interpolating images (conversion techniques) or for reconstructing images (compression techniques). Generally the information concerning static areas is useful for all algorithms which detect motion in video pictures sequences as the areas with zero motion are the ones which occur statistically most frequently in broadcasted video scenes.

In an upconversion or a video standards conversion application, the resolution of the output sequence may be optimised in non-moving areas by switching motion-compensated processing off and simply copying the source pixels to the output.

In the field of MPEG2 video encoding, savings in bit rate can be achieved by transmitting a minimal amount of information in the blocks classified as static. Indeed, provided that the motion-compensation applies to two frames or two fields with the same parity, it is sufficient for static blocks to transmit only the information that the block is static. This means that the motion vector for the block is 0, and that all prediction errors (reference is made to the MPEG2 video standard with respect to this expression), should be 0 (they may not be exactly 0, but if it is determined that the block is static, then it is clear that non-zero prediction errors represent noise contributions which should not be transmitted).

An additional benefit results from the fact that the human eye is more sensitive to defects in still areas than in moving areas, so that the information concerning the position of static areas in the pictures is highly welcome, because by simply copying the source pixels of the static areas defects due to motion compensation processing will be avoided.

SUMMARY OF THE INVENTION

The object of the invention is to provide a reliable algorithm for detecting static areas in a sequence of video pictures. This object is achieved according to the invention by means of the measures specified in claim 1.

In principle the method according to the invention consists of five steps:

First, a computation of pixel difference values between corresponding pixels of consecutive frames or consecutive fields with identical parity is performed.

Second, the magnitudes of the pixel differences over pixel blocks of the video pictures are accumulated.

Third, threshold values for the accumulated pixel differences are computed for the blocks.

Fourth, the threshold values are compared to the accumulated pixel differences, thus providing a raw map of static blocks.

Fifth, the raw map of static areas is cleaned up by eliminating isolated static blocks or small groups of adjacent static blocks.

The present invention achieves a good reliability of the detection of static blocks in case of interlaced sources because it operates on two fields having the same parity. Thus, unwanted disturbances due to interlace effects are avoided. The robustness of the detection of static areas in the presence of noise is improved by accumulating the magnitudes of the difference values of corresponding pixels, as the random variations of the noise component are smoothed out.

Advantageous developments of and improvements to the method specified in claim 1 are possible by virtue of the measures evinced in the dependent claims. The reliability of the method is further increased by adapting the thresholds for the blocks to an estimated noise level of the field or frame and to the amount of a block gradient. The reason for taking block gradients into account is that even very small movements of the video camera will cause significant pixel differences in areas where high spatial frequencies are present. The formula for the determination of the thresholds therefore includes a "penalty" term which is proportional to the block gradient.

A simple formula for calculating the thresholds taking this into account is given in claim 3. If in a block a lot of high spatial frequency components and/or substantial noise is present, then the corresponding threshold which will be compared to the accumulated pixel differences of the block will be high. With these measures the decision of classifying a block to be static or non-static is somewhat normalised, i.e. made independent of noise and picture content.

One preferred embodiment for determining the block gradients is presented in claim 4.

Preferred examples for the proportional constants $\alpha$, $\beta$ in the formula for calculating thresholds are given in claim 5.

Advantageous developments of and improvements to the method specified in claim 1 are possible by virtue of the measures evinced in the dependent claims. One preferred embodiment for determining the block gradients is presented in claim 4.

A simple embodiment for applying the thresholds to the accumulated frame differences is presented in claim 6.

An advantageous solution for cleaning up the preliminary map of static areas is presented in claim 7. Therein, isolated static blocks or small groups of adjacent blocks are eliminated from the preliminary map of static/non-static blocks.

Important examples of devices where the invention may be used are claimed in claims 9 to 11.

BRIEF DESCRIPTION OF THE DRAWINGS

Exemplary embodiments of the invention are illustrated in the drawings and are explained in more detail in the following description. In the figures:

FIG. 2a) shows an illustration of consecutive video frames for explanation of the calculation of pixel differences between corresponding pixels;

FIG. 2b) shows an illustration of consecutive video fields for explanation of the calculation of pixel differences between corresponding pixels in fields of equal parity;

FIG. 3 shows an excerpt of a video frame wherein the frame is subdivided in blocks of equal size;

FIG. 4 shows an excerpt of a preliminary map of static areas;

FIG. 5 shows an example of vertical and horizontal neighbourhoods used for the cleaning up process of the preliminary map of static areas and FIG. 6 shows an excerpt of a final map of static areas corresponding to FIG. 4;

DESCRIPTION OF THE PREFERRED EMBODIMENT

A presumption for the new method for detecting static areas in two consecutive video pictures is that the video pictures are available in digital form, i.e. that the analogue source video signal is sampled and quantized. The thus generated digital pixel values are stored in frame or field memories as it is well known in the art. If the source video signal is e.g. a standard NTSC signal, the sampling frequency is 13.5 MHz and the frame repetition rate is 30 frames per second. One horizontal line period lasts 63.5 μs. Therefore, 858 pixels are generated in each horizontal line. As each frame consists of 525 scanning lines in the NTSC system one frame has 858×525=450,450 pixels. Mostly 8 bits are used to represent one pixel. In case of field memories one field memory must provide 858×262.5=225,225 Bytes of memory capacity.

The inventive method is adapted to work with both, progressive scan and interlace scan video pictures. More detailed explanation of the differences will be given below.

The new method for detecting static areas in succeeding video pictures consists of several steps which have to be performed one after the other. All steps may be executed by one processing unit consisting e.g. of one microprocessor which executes a corresponding computer programme. An example of such a programme is now explained with respect to FIG. 1. It goes without saying, that the method may also be implemented in a specific integrated circuit like an ASIC which has specialised hardware for performing the different steps/tasks.

In step 10 one first frame N−1 is read in a first frame memory in case of progressive scan video systems. In case of interlace scan video systems in this step one odd/even field is read in a first field memory. In step 11 the next frame N is read in a second frame memory for progressive scanning video systems. For interlace scanning video systems in this step the next odd/even field having the same parity as the first field read in step 10 is read in a second field memory. When these steps are performed, two parallel branches of the programme are executed.

Pictures can be modelled in a first approach as the superimposition of a signal component, representing the information contents of the images, and a noise component. In non-moving picture parts, the difference between corresponding pixels are actually samples of the inter-field or inter-frame noise difference. In moving picture parts, because the physical spot on a scene object represented at a given pixel location will differ from one picture to the next, an additional signal difference contribution will be added to the noise difference. As a result, the magnitudes of the differences will, on average, be larger in moving parts than in static parts. This is the reason why in the inventive method pixel differences are compared with thresholds for differentiating static from moving pixels.

Figure 1:
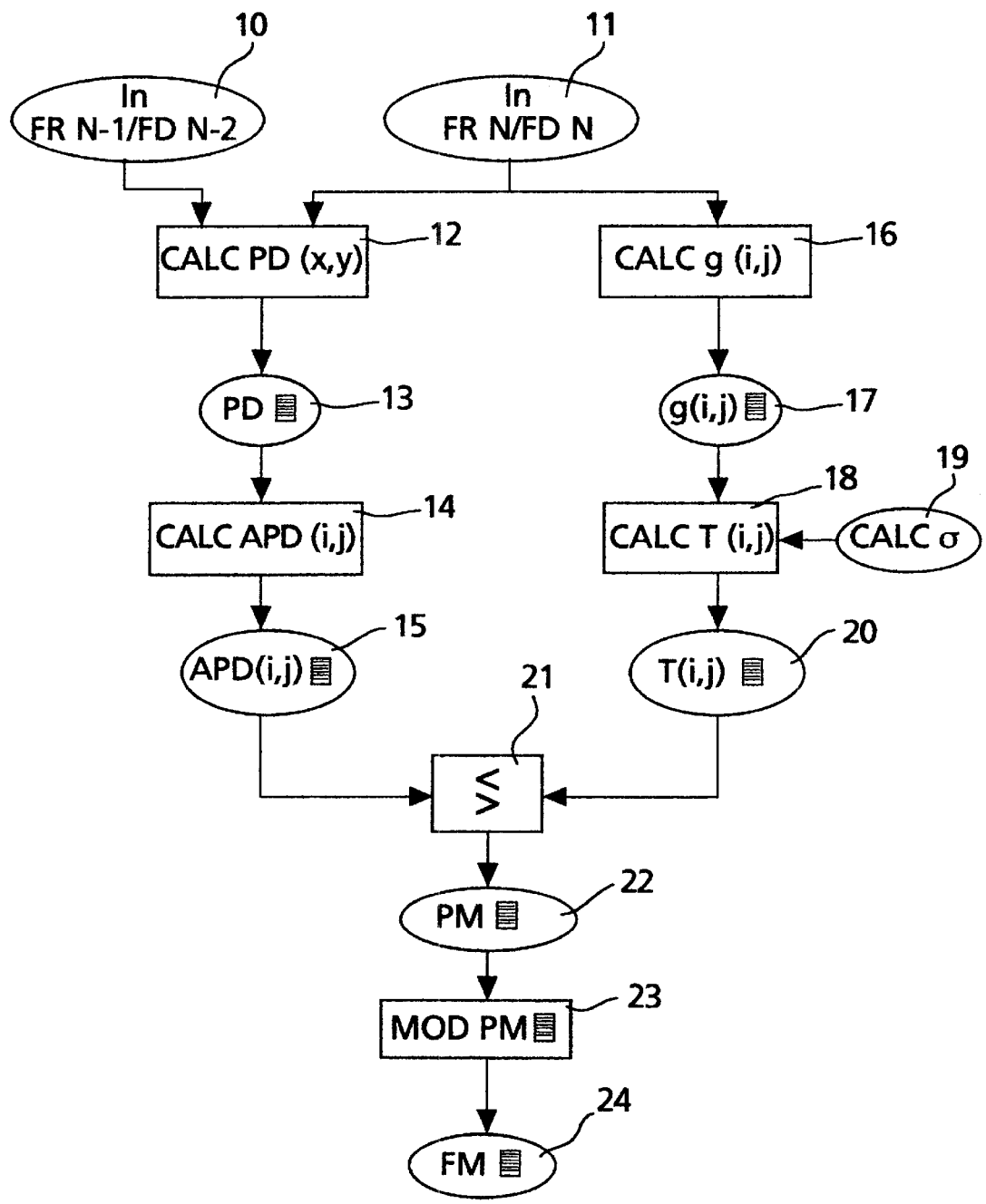
FIG. 1 shows a flow chart of the algorithm used for detecting static areas in a sequence of video pictures.

Coming back to the flow chart of FIG. 1 the first branch consists of the steps 12 to 15 in which the two frames/fields are analysed with respect to their differences. The second branch consists of the steps 16 to 20 wherein thresholds are calculated which are used to decide which parts of the picture are static or non-static.

First, the first branch with the steps 12 to 15 will be explained. The proposed method is based on the analysis of differences within the pixels of succeeding frames/fields. The differences are defined as the differences in grey levels between pixels occupying the same location:

in two consecutive frames in case of a progressive input source, in two fields of identical parity, i.e. separated by two field periods, in case of an interlaced input source.

In step 12 a computation of pixel differences is performed for the two frames or fields stored in the frame/field memories. FIG. 2 shows in its upper part two consecutive frames N−1 and N. Therein, frame N−1 concerns the previous frame and frame N concerns the current frame. The frames consist of a number of lines which are also depicted in FIG. 2. Each line consists of a number of pixels as above mentioned. One pixel 30 is shown separately in both frames N−1 and N. The pixel differences between these two pixels are calculated by applying the following formula:

$$PD(x,y)=L^N(x,y)-L^{N-1}(x,y)$$

Therein, $L^N(x,y)$ represents the luminance value of the pixel 30 in the current frame at the position (x,y) and $L^{N-1}(x,y)$ represents the luminance value of the pixel 30 in the previous frame at the position (x,y).

In the lower part of FIG. 2 three consecutive fields N−2, N−1, N are shown in case of interlaced video pictures. Fields N−2 and N are fields with identical parity whereas field N−1 has the opposite parity. This is also apparent from FIG. 2 when looking to the depicted solid and dotted lines. An example for corresponding pixels from which the difference value is to be calculated is once more indicated with the reference sign 30. The following formula is applied in this case:

$$PD(x,y)=L^N(x,y)-L^{N-2}(x,y)$$

The results of the pixel difference calculation are stored in corresponding memory locations in step 13. The frame/field memory storing the oldest frame N−1/field N−2 can be used for this purpose. In the memory a map of pixel differences is stored as a result.

In step 14 the magnitudes of the pixel differences are accumulated over predetermined blocks of pixels, which may or may not be overlapping. An example for a subdivision of a frame or field in non-overlapping blocks is shown in FIG. 3. In this example each block consists of 16×8 pixels. Of course, other examples may be used, e.g. 8×8 pixel blocks etc. The use of non-overlapping blocks simplifies the memory organisation.

For each block B(i,j), an accumulated pixel difference APD(i,j) is computed as the sum, over all the pixels making up the block, of the absolute values of the single pixel differences PD(x,y). This improves the robustness of the detection of static blocks in the presence of noise, as the random variations of the noise component in the images are smoothed out by the accumulation operation.

The accumulated pixel difference values APD(i,j) are collected in step 15 in corresponding memory locations.

Note, that numbers i,j determine the position of the block within the frame or field.

Next, the second branch of FIG. 1 with steps 16 to 20 is explained in detail. In this branch the thresholds T(i,j) for each of the aforementioned blocks are calculated. Note, that within this branch pixel data of only the current frame/field is to be considered. In step 16 a computation of a "block gradient" g(i,j) is made. This block gradient represents the amount of spatial gradients present in the current block B(i,j). In the preferred embodiment of the invention, g(i,j) is computed as the larger of a horizontal $g_x(i,j)$ and a vertical $g_y(i,j)$ gradient component according to the following formula:

$$g(i,j)=MAX[g_x(i,j), g_y(i,j)],$$

wherein the horizontal $g_x(i,j)$ (respectively vertical $g_y(i,j)$) gradient component is estimated as the average, over the N pixels P(k,l) with grey levels L(k,l) making up the current block B(i,j), of the absolute values of the luminance differences between horizontally (respectively vertically) adjacent pixels according to the following formula:

$$\begin{cases} g_x(i, j) = \frac{1}{N} \sum_{L(k,l) \in B(i,j)} |L(k, l) - L(k - 1, l)| \\ g_y(i, j) = \frac{1}{N} \sum_{L(k,l) \in B(i,j)} |L(k, l) - L(k, l - 1)| \end{cases}$$

The thus calculated block gradients are stored in corresponding memory locations in step 17. The reason for taking block gradients into account is that even very small movements of the camera will translate into significant pixel differences in areas where high spatial frequencies are present.

The thresholds are calculated in step 18. The thresholds T(i,j) are made adaptive to the block gradients in that they include a "penalty term" proportional to the block gradient. They are also made adaptive to the estimate of the noise level of the current field or frame. The noise level is provided as an external input to step 18. The estimation of noise in video pictures is a well known problem in the video processing field. One method and apparatus for noise measurement is e.g. disclosed in patent application EP-A-0 562 407. Therefore, it is not necessary to explain the noise estimation process in detail here. But it is made reference to the above mentioned patent application for this purpose. It may be appreciated that a new method for noise estimation in video pictures is subject of another invention of the applicant filed at the same date under the internal reference PF980012.

Letting N be the number of pixels in a block and σ the available estimation of the noise level, each threshold T(i,j) is derived as a weighted average of σ and g(i,j):

$$T(i,j)=N(\alpha\sigma+\beta g(i,j))$$

The numbers α and β depend on what precisely the noise level a and the block gradient g(i,j) represent. For this purpose a table with different values for α and β may be stored in memory. If g(i,j) is computed following the preferred embodiment of the invention, as described above, and if a represents a standard deviation expressed as a grey level, then preferred choices of α and β are e.g. 1.4 and ⅛ respectively.

In step 20 the thresholds are collected in corresponding memory locations.

In the next step 21, the accumulated pixel differences APD(i,j) are compared to the thresholds T(i,j) for each block B(i,j), to provide a preliminary map PM of static areas. Each pixel PM(i,j) of this map is associated to a block B(i,j) and represents the binary decision (static or non-static) taken for this block. With the convention that 1 (respectively 0) values represent static (respectively non-static) blocks, PM(i,j) is given by:

$$\begin{cases} PM(i, j) = 1 & \text{if } APD(i, j) \leq T(i, j) \\ PM(i, j) = 0 & \text{if } APD(i, j) > T(i, j). \end{cases}$$

The comparison is made within step 21 and the results are entered in memory in step 22. A preliminary map of static areas is available in memory after complete execution of step 22. An example for such a preliminary map PM is shown in FIG. 4.

It is to be noted that there are some static blocks within an area of a plurality of non-static blocks. Usually the dimensions of the blocks will be significantly smaller than the likely dimensions of physical objects in the picture. In this case, isolated static blocks or small groups of isolated static blocks cannot represent static objects and must be the result of erroneous detections. Therefore, the pixels associated to these static blocks in the preliminary map have to be replaced with pixels indicating non-static blocks.

For this purpose a map erosion step is performed next in step 23. Within this step, the preliminary map PM is eroded by eliminating isolated static blocks or small groups of adjacent static blocks, to provide the final map FM of static areas. This step is mainly useful when the dimensions of the blocks are significantly smaller than the dimensions of physical objects in the picture.

In the preferred embodiment of the invention, the erosion is implemented by processing each of the entries in the preliminary map (or equivalently each of the blocks in the current field or frame) as follows: If the current block B(i,j) has been classified as non-static, i.e. PM(i,j)=0, then also set FM(i,j)=0 (i.e. do nothing), else if PM(i,j)=1:

1. Consider a horizontal neighbourhood centred on the current block and made up of $M_x$ blocks horizontally adjacent to it;
2. Count the number $S_x$ of blocks classified as static within this neighbourhood;
3. If the ratio $S_x/M_x$ is less than a predetermined threshold $T_x$, then set FM(i,j)=0, i.e. declare the block non-static;
4. Consider a vertical neighbourhood centred on the current block and made up of $M_y$ blocks vertically adjacent to it;
5. Count the number $S_y$ of blocks classified as static within this neighbourhood;
6. If the ratio $S_y/M_y$ is less than a predetermined threshold Ty, then set FM(i,j)=0.

Figure 5:
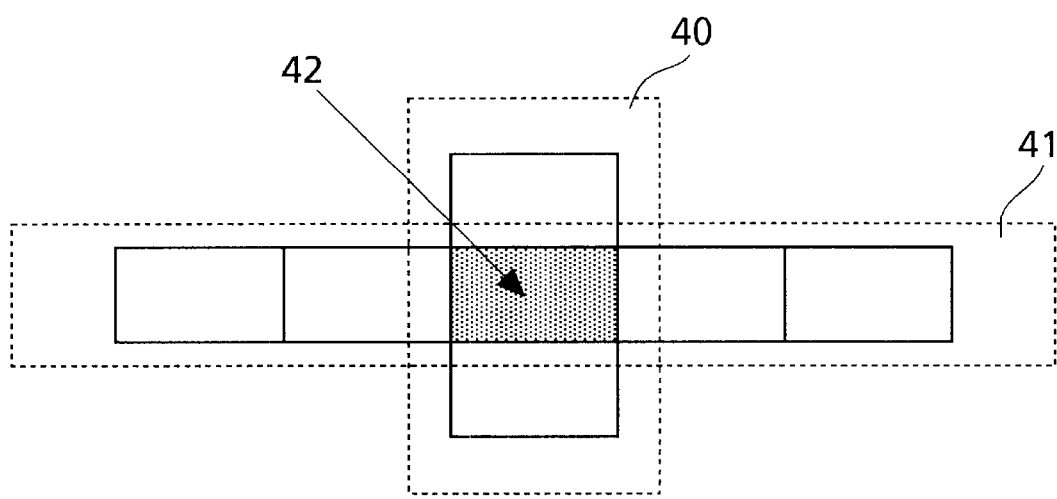

The values of $M_x$, $M_y$, $T_x$, and $T_y$ should be adapted to the dimensions of the blocks and of the picture. An example for horizontal and vertical neighbourhoods used for the map erosion process in standard TV pictures like NTSC, PAL, SECAM and 16×8 blocks is shown in FIG. 5. Reference symbol 40 denotes the vertical neighbourhood consisting of 3 vertically adjacent blocks. Reference symbol 41 denotes the horizontal neighbourhood consisting of 5 horizontally adjacent blocks. The current block is denoted with reference sign 42. In this example, the $T_x$ value is determined to be ⅗ and the $T_y$ value is determined to be ⅔.

For blocks which are positioned at the borders of the fields or frames the steps for the erosion of the preliminary map may be modified. E.g. for blocks of the top and bottom borders steps 4 to 6 can be omitted. For blocks of the left and right borders steps 1 to 3 can be omitted.

After the map erosion step 23, the final map of static blocks is made available in memory within step 24. FIG. 6 shows the resulting final map after the cleaning up process of the preliminary map shown in FIG. 4.

What is claimed is:

1. Method for detecting static areas in a sequence of digital video pictures comprising the steps of:
   a) computation of pixel differences between corresponding pixels of consecutive frames or consecutive fields with identical parities;
   b) accumulation of the magnitudes of the pixel differences over blocks of pixels of the video frames;
   c) computation of thresholds T(i,j) for pixel blocks, wherein the threshold T(i,j) for each block is adapted to
      i) an estimated noise level σ for the current field or frame; and
      ii) to the amount of a block gradient g(i,j), and the threshold levels T(i,j) are calculated according to the formula $T(i,j)=N(\alpha\sigma+\beta g(i,j))$, therein, N represents the number of pixels within a block and the numbers α and β are selected dependent on how the estimated noise level σ and block gradient g(i,j) are defined;
   d) applying the thresholds T(i,j) to the accumulated pixel differences of the corresponding blocks thus providing a preliminary map of static areas;
   e) modifying the preliminary map of static areas by eliminating isolated static blocks or small groups of adjacent static blocks.

2. Method according to claim 1, wherein the block gradient g(i,j) is computed as the larger of an horizontal $g_x(i,j)$ and a vertical $g_y(i,j)$ gradient component, i.e.

$g(i,j)=MAX[g_x(i,j), g_y(i,j)]$, wherein i,j are the block numbers within a row and column of a frame or field and the horizontal and vertical gradient components $g_x(i,j)$ and $g_y(i,j)$ are calculated as the average of the absolute values of the luminance differences between horizontal adjacent pixels on one hand and vertical adjacent pixels on the other hand over N pixels P(k,l) with grey values L(k,l) of a block B(i,j), i.e.

$$\begin{cases} g_x(i,j) = \frac{1}{N} \sum_{L(k,l) \in B(i,j)} |L(k,l) - L(k-1,l)| \\ g_y(i,j) = \frac{1}{N} \sum_{L(k,l) \in B(i,j)} |L(k,l) - L(k,l-1)| \end{cases}$$

3. Method according to claim 2, wherein α is selected to be 1.4 and β to be ⅛ if the noise level σ of the frame represents a standard deviation expressed as a grey level.

4. Method according to claim 1, wherein accumulated pixel differences APD(i,j) of the blocks B(i,j) are compared to the corresponding thresholds T(i,j) and wherein to each block B(i,j) a value is assigned which represents whether the block is static or non-static according to the formula:

$$\begin{cases} PM(i,j) = 1 \text{ if } APD(i,j) \leq T(i,j) \\ PM(i,j) = 0 \text{ if } APD(i,j) > T(i,j) \end{cases}$$

wherein PM(i,j) is an entry in the preliminary map of static areas and the values 1 define static blocks and 0 non-static blocks.

5. Method for detecting static areas in a sequence of digital video pictures comprising the steps of:
   a) computation of pixel differences between corresponding pixels (30) of consecutive frames or consecutive fields with identical parities;
   b) accumulation of the magnitudes of the pixel differences over blocks (B(i,j)) of pixels of the video frames;
   c) computation of thresholds T(i,j) for pixel blocks;
   d) applying the thresholds T(i,j) to the accumulated pixel differences of the corresponding blocks thus providing a preliminary map (PM) of static areas;
   e) modifying the preliminary map (PM) of static areas by eliminating isolated static blocks or small groups of adjacent static blocks, wherein the preliminary map of static areas is processed as follows:
      e1) if a current block B(i,j) has been classified as non-static in the preliminary map of static areas, i.e. PM(i,j)=0 then also the corresponding entry in the final map of static areas is classified as non-static, i.e. FM(i,j)=0;
      e2) if a current block B(i,j) has been classified as static then the following procedure is applied:
         i) a horizontal neighbourhood of $M_x$ blocks, centred on the current block is created;
         ii) the number $S_x$ of blocks classified as static within this neighbourhood is counted;
         iii) it is analysed whether the ratio $S_x/M_x$ is less than a predetermined threshold $T_x$ and if this is true, the current block is classified as non-static, in the final map of static areas, i.e. FM(i,j)=0;
         iv) a vertical neighbourhood (40) of $M_y$ blocks, centred around the current block is created;
         v) the number $S_y$ of blocks classified as static within this neighbourhood is counted;
         vi) it is analysed whether the ratio $S_y/M_y$ is less than a predetermined threshold $T_y$ and if this is true, the current block is classified as non-static in the final map of static areas, i.e. FM(i,j)=0.

6. Method according to claim 5, wherein the values $M_x$, $M_y$, $T_x$, $T_y$ are adapted to the dimensions of the blocks and of the frames or fields.

7. Use of the method according to claim 1 in a device for motion compensated encoding of video pictures.

8. Use of the method according to claim 1 in a device for temporal video format conversion, particularly 50 Hz to 100 Hz upconversion, 50 Hz to 60 Hz standard conversion, or 60 Hz to 50 Hz standard conversion.

9. Use of the method according to claim 1 in a video signal processing device for interlace to progressive scan conversion.

* * * * *